(12) United States Patent
Berger et al.

(10) Patent No.: US 10,381,906 B2
(45) Date of Patent: Aug. 13, 2019

(54) SHORT-CIRCUIT RING FOR AN ELECTRICAL ASYNCHRONOUS MACHINE, COMPOSED OF PARTIAL RING SEGMENTS

(71) Applicant: ROBERT BOSCH GMBH, Stuttgart (DE)

(72) Inventors: Thomas Berger, Ditzingen (DE); Arndt Kelleter, Erdmannhausen (DE); Harald Laue, Esslingen (DE)

(73) Assignee: ROBERT BOSCH GmbH, Stuttgart (DE)

(*) Notice: Subject to any disclaimer, the term of this patent is extended or adjusted under 35 U.S.C. 154(b) by 823 days.

(21) Appl. No.: 14/897,761

(22) PCT Filed: May 14, 2014

(86) PCT No.: PCT/EP2014/059823
§ 371 (c)(1),
(2) Date: Dec. 11, 2015

(87) PCT Pub. No.: WO2014/198477
PCT Pub. Date: Dec. 18, 2014

(65) Prior Publication Data
US 2016/0141944 A1 May 19, 2016

(30) Foreign Application Priority Data
Jun. 13, 2013 (DE) .................. 10 2013 211 040

(51) Int. Cl.
*H02K 17/16* (2006.01)
(52) U.S. Cl.
CPC ....... *H02K 17/165* (2013.01); *H02K 2213/12* (2013.01)

(58) Field of Classification Search
CPC .................................................. H02K 17/165
See application file for complete search history.

(56) References Cited

U.S. PATENT DOCUMENTS

| 2,248,167 | A | * | 7/1941 | Elsey | ................. H02K 15/0012 29/598 |
| 4,131,990 | A | * | 1/1979 | Roach | ................ H02K 15/0012 228/185 |
| 5,068,560 | A |   | 11/1991 | Lundquist |   |
| 5,729,885 | A |   | 3/1998 | Carosa et al. |   |

(Continued)

FOREIGN PATENT DOCUMENTS

| DE | 199 19 899 | 9/2000 |
| DE | 10 2005 030 798 | 1/2007 |

(Continued)

OTHER PUBLICATIONS

Google translation for the foreign document JP 2004 236456.*
International Search Report for PCT/EP2014/059823, dated May 7, 2014.

*Primary Examiner* — Mohamad A Musleh
(74) *Attorney, Agent, or Firm* — Norton Rose Fulbright US LLP; Gerard Messina

(57) ABSTRACT

A short-circuit ring for a rotor of an electrical asynchronous machine is circular and has along its circumference a multiplicity of recesses extending in the axial direction, into which rods of a rotor cage of the asynchronous machine can be placed. The short-circuit ring is assembled from a plurality of partial ring segments.

10 Claims, 3 Drawing Sheets

(56) References Cited

U.S. PATENT DOCUMENTS

| | | | |
|---|---|---|---|
| 7,504,756 B2 * | 3/2009 | Caprio | .............. H02K 17/165 310/211 |
| 2007/0284953 A1 | 12/2007 | Lyons et al. | |
| 2013/0020899 A1 | 1/2013 | Kleber | |

FOREIGN PATENT DOCUMENTS

| | | |
|---|---|---|
| DE | 10 2009 034 647 | 1/2011 |
| EP | 2 299 565 | 3/2011 |
| EP | 2 597 762 | 5/2013 |
| JP | 2004 236456 | 8/2004 |
| RO | 112 325 | 7/1997 |

\* cited by examiner

SHORT-CIRCUIT RING FOR AN ELECTRICAL ASYNCHRONOUS MACHINE, COMPOSED OF PARTIAL RING SEGMENTS

BACKGROUND OF THE INVENTION

1. Field of the Invention

The present invention relates to electrical asynchronous machines, and in particular to a short-circuit ring for an electrical asynchronous machine.

2. Description of the Related Art

Due in particular to their robustness and reliability, electrical asynchronous machines are used for a large number of industrial applications. Currently, electrical asynchronous machines that have a so-called squirrel cage on the rotor are being further developed in particular for use in electric or hybrid vehicles, because in such asynchronous machines, in contrast to synchronous machines, magnets do not have to be used in the rotor, so that very expensive rare earth permanent magnets that can be used for this purpose can be done without.

In an electrical asynchronous machine, during operation high electrical currents are induced in a squirrel cage provided on a rotor, and on the basis of these currents strong magnetic fields can be generated between the rotor and a stator that can then cause torques that act on the rotor. Here, on the one hand electrical resistances inside the squirrel cage should be kept as low as possible in order to minimize losses in the current induced in the squirrel cage. On the other hand, the squirrel cage should be mechanically stable in order to withstand the high mechanical stresses, in particular high occurrent centripetal forces, that occur during operation of the asynchronous machine.

In general, a squirrel cage of an asynchronous machine is made up of a large number of rods extending in the axial direction of the asynchronous machine, and at least two short-circuit rings that connect the rods to one another electrically and mechanically at their respective ends. Rods and short-circuit rings here are preferably made of a material having good electrical conductivity, in particular a metal such as copper or aluminum, or alloys thereof.

Published German patent DE 199 19 899 C1 indicates a squirrel cage for an electrical asynchronous machine. Published German patent application document DE 10 2005 030 798 A1 indicates an alternative embodiment of a rotor of an asynchronous machine.

Squirrel cages of rotors of an asynchronous machine for motor vehicles are today often produced using casting methods. Here, short-circuit rings and rods can be injected directly around a lamella packet of the rotor placed into a tool, so that a homogenous composite can result of, for example, pure copper, having very good electrical conductivity properties.

Alternatively, a squirrel cage can be made up of separately produced rods and short-circuit rings. Here, the rods can be introduced into suitably fashioned grooves of lamella packets forming the rotor, and then connected at their ends by short-circuit rings. Here the short-circuit rings also have suitably formed recesses, for example in the form of grooves, into which the rods can be introduced. Rods mounted in this way can then be connected to the short-circuit ring after the joining, for example by solder, mechanical deformation, or laser welding.

In the case of squirrel cages made up of rods and short-circuit rings, the short-circuit rings up to now have usually been produced in one piece, or assembled from a multiplicity of annular sheets. The short-circuit rings here can either be cast and subsequently processed, or mechanically produced from semi-finished parts. Laser cutting methods and water jet cutting methods have also been used.

However, the larger the diameter of a rotor of an asynchronous machine that is to be provided with a squirrel cage is, the more expensive it is, as a rule, to manufacture the short-circuit rings. For example, for a full circle for the short-circuit ring having a diameter of greater than 300 mm, up to 100 grooves have to be provided to accommodate rods of the squirrel cage in the short-circuit ring. A casting of short-circuit rings having such a large diameter and having a large number of grooves, in particular made of copper, which is highly electrically conductive, is currently not possible, or at least requires a significant technical outlay.

BRIEF SUMMARY OF THE INVENTION

Specific embodiments of the present invention advantageously enable provision of a short-circuit ring for an electrical asynchronous machine in such a way that the short-circuit ring can be produced easily and at low cost. Here, the short-circuit ring can both enable very low electrical resistance losses and can withstand the mechanical stresses that occur for example in fast-rotating asynchronous machines.

According to an aspect of the present invention, a short-circuit ring for an electrical asynchronous machine is described that is circular and that has along its circumference a large number of recesses extending in the axial direction, into which rods of a rotor cage of the asynchronous machine can be placed. The short-circuit ring is distinguished in that it is made up of a plurality of partial ring segments.

An idea forming the basis of the proposed short-circuit ring can be understood, inter alia, as being that the short-circuit ring is no longer to be provided as an individual annular closed element, as in the conventional case, but rather is put together from a plurality of segments. Each of the segments here are to have the shape of partial ring-shaped arcs, i.e., forming a part of a circular ring, so that a plurality of such segments can, in the assembled state, form the overall short-circuit ring. Each of the individual segments can for example have a recess or a few recesses, for example up to ten recesses, in the form of grooves into which rods of a rotor cage of the asynchronous machine can be placed. The short-circuit ring made up of the plurality of segments can then have the sum of the recesses of the segments, for example 100 or more recesses.

Due to the fact that the short-circuit ring is not provided as an individual annular part, or assembled from a plurality of annular parts, but rather can be assembled from a plurality of partial ring segments, a large number of advantages are achieved, as presented below.

The partial ring segments can for example be extruded. Extrusion is understood as a shaping method that is one of the pressure shaping methods, by means of which in particular even irregularly shaped prismatic profiles can be produced. Here, a so-called preform, heated to a shaping temperature ahead of time if necessary, is pressed through a matrix using a stamp, so that the outer shape of the extrusion strand is determined by the matrix. Hollow spaces can be produced using, for example, differently shaped mandrels. In this way, prismatic profiles can be produced having lengths up to several meters. Subsequently, the profile can be sawed off from the strand to the length of the later short-circuit ring.

Extruded partial ring shaped segments can be produced at low cost. Inter alia, metals having very good electrical conductivity, such as copper or copper alloys, can also be extruded. In particular if the segments have been extruded at low temperatures, i.e. in the context of a cold shaping process, with high pressures, they can have a very high degree of mechanical strength, generally exceeding the strength of short-circuit rings formed at high temperatures, for example cast short-circuit rings. Moreover, with the extrusion of segments, as a rule there is no loss of for example expensive copper material, as conventionally occurs when the short-circuit ring is assembled from a plurality of stamped annular sheets, because stamping unavoidably produces waste.

As an alternative to, for example, extruded segments having a thickness of several millimeters, the partial ring segments can also be fashioned as thin sheets. These thin sheets can for example be stamped into the desired partial ring shape. A plurality of sheets stamped into this partial ring shape can then be placed against one another in the circumferential direction and assembled to form a short-circuit ring. In order to give the short-circuit ring the desired length in the axial direction, a plurality of the thin sheets can be stacked one after the other. The sheets configured in different planes in the axial direction can preferably be configured so as to be offset to one another in the circumferential direction.

In other words, the entire short-circuit ring can be made up on the one hand of a plurality of partial ring sheet segments, connected to one another in series in the circumferential direction, and forming a ring as a whole, and on the other hand of a plurality of layers of such rings. In particular if the partial ring sheet segments of the individual layers are configured so as to be offset to one another in the circumferential direction, a high degree of mechanical stability of the overall short-circuit ring can be achieved.

Advantageously, all partial ring segments forming the short-circuit ring have an identical geometry. For example, the overall short-circuit ring can be made up of a plurality of identically shaped extruded segments, or of a large number of identically formed sheet segments. In this way, on the one hand the manufacturing of the segments can be simplified, because only a single type of segment has to be produced, and correspondingly few tools are required for this. On the other hand, in this way storage and transport of the segments, as well as their processing, can also be simplified, because the segments can be stored and transported for example as bulk goods. Due to the fact that the short-circuit ring is not provided as an overall one-piece ring, but rather is assembled from a large number of partial ring segments, the space requirement necessary for the storage and transport of the components for the short-circuit ring can moreover be reduced.

Adjacent partial ring segments can be connected to one another by a groove-spring connection. In such a groove-spring connection, a protruding region, designated a spring, is fashioned on a segment on a surface oriented toward an adjacent segment, and on the corresponding countersurface of the adjacent segment a recess is formed that is designated a groove. The protruding region and the recess are preferably formed so as to be complementary to one another, so that they can engage in one another preferably with a frictional and positive fit. In this way, it can be achieved that adjacent segments experience an adequate mechanical hold with one another already upon the initial assembly of the short-circuit ring. The protruding region and the recess can have any suitable geometry, such as a round shape, a polygon shape, a dovetail shape, or similar shapes.

Adjacent partial ring segments can preferably be connected to one another with a material bond. Such a materially bonded connection increases both the mechanical strength of the short-circuit ring and also an electrical conductivity along the circumference of the short-circuit ring.

In particular, adjacent partial ring segments can be welded or soldered to one another.

Welding adjacent segments can take place using various suitable techniques, such as arc welding, friction welding, ultrasound welding, etc. In particular laser welding appears to be an advantageous technology for the material bonding of adjacent segments, because using it even complex geometries can be welded together, and a minimum of tools is required to hold and join the segments during the welding. A further advantage of laser welding is a minimal heat input.

Alternatively, the adjacent segments can also be soldered to one another individually, through local soldering at the boundary surfaces between adjacent segments, or as a totality of the short-circuit ring assembled from the segments, through immersion in an immersion soldering bath.

The partial ring segments can in principle be made of an electrically conductive material, in particular metal. However, the fashioning of the short-circuit ring from a plurality of segments appears to be particularly advantageous for the case in which the segments are made of copper or a copper alloy. Copper and alloys thereof have very high electrical conductivity and are therefore particularly well-suited to conduct the high electrical currents occurring in the short-circuit ring of an asynchronous machine with as little loss as possible. On the other hand, copper can be processed to form large components, such as a one-piece short-circuit ring having a large diameter, only with difficulty. In particular, casting of a large component made of copper has proven to be problematic. Through the assembly proposed herein of the short-circuit ring from a large number of partial ring segments made of copper or a copper alloy, these difficult-to-process materials can easily be processed to form smaller parts in the form of the segments, while nonetheless exploiting the advantageous electrical properties of the materials.

The above-described short-circuit ring can in particular be used in an electrical asynchronous machine, the proposed segmenting of the short-circuit ring proving particularly advantageous in asynchronous machines having a large rotor diameter, as are used to produce high torques for example in passenger vehicles or trucks.

Possible features and advantages of specific embodiments of the present invention are herein partly described in reference to a short-circuit ring according to the present invention, partly in reference to the manufacture of such a short-circuit ring, and partly in reference to an electrical asynchronous machine having such a short-circuit ring. Those skilled in the art will recognize that the described features can be exchanged or combined with one another in a suitable manner in order to arrive at further specific embodiments and, possibly, synergy effects.

In the following, specific embodiments of the present invention are described with reference to the accompanying drawings; neither the descriptions nor the drawings are to be interpreted as limiting the present invention.

DETAILED DESCRIPTION OF THE INVENTION

Figure 1:
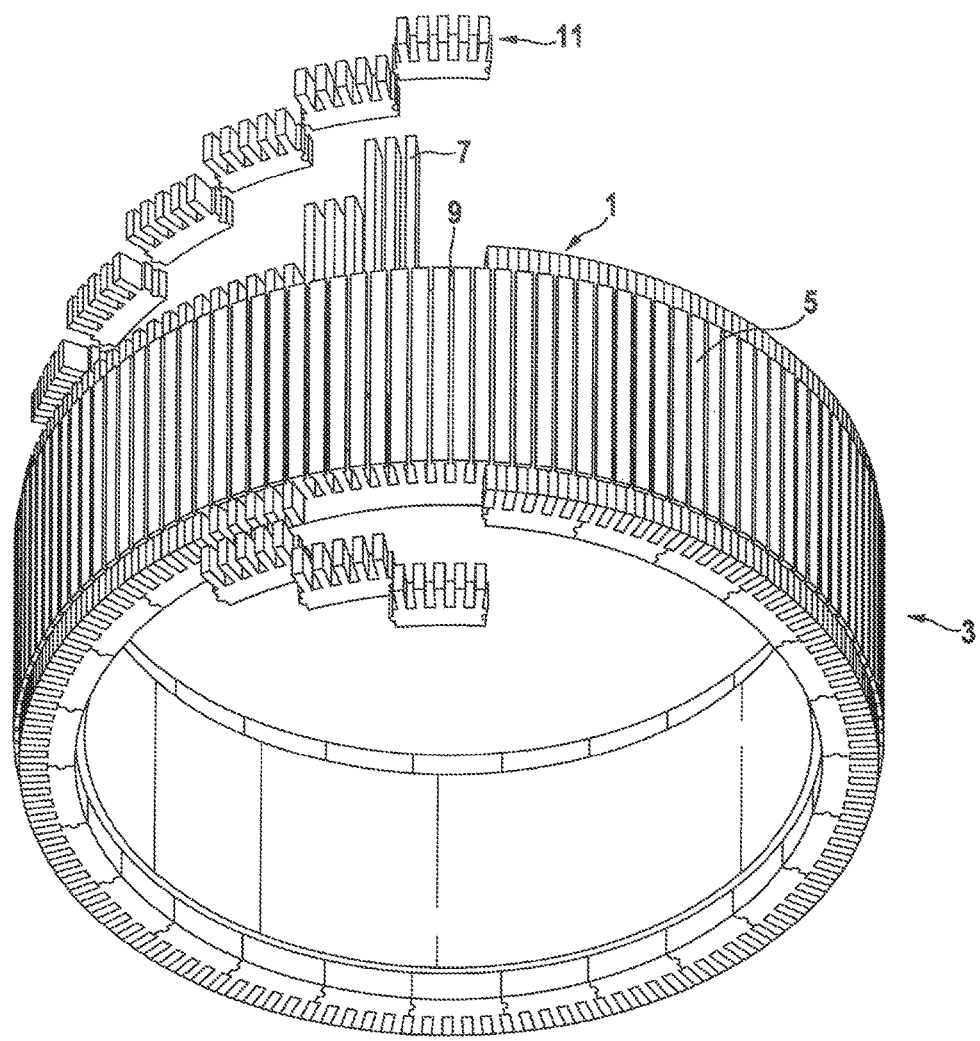
FIG. 1 shows a perspective view of a rotor of an electrical asynchronous machine having a short-circuit ring made up of segments, according to a specific embodiment of the present invention.

The Figures are merely schematic and are not to scale. Identical reference characters designate identical components, or components having identical function.

FIG. 1 shows a rotor 3 for an electrical asynchronous machine according to a specific embodiment of the present invention. Rotor 3 has an essentially cylindrical rotor body 5 on whose outer side there is fashioned a large number of grooves 9 running in the longitudinal direction. Rotor body 5 itself can be made of a soft magnetic material. On rotor body 5 there is situated a squirrel cage that is made up of oblong rods 7 and two short-circuit rings 1. The oblong rods are placed into grooves 9 of rotor body 5 and axially protrude therefrom. The two short-circuit rings 1 are situated on the two axial ends of rotor body 5. Short-circuit rings 1 also have recesses 13 in the form of grooves that can accommodate the ends of rods 7 protruding past rotor body 5. Rods 7, configured at a distance from one another along the circumference and running parallel to one another, are both held mechanically and connected to one another electrically by short-circuit rings 1.

In specific embodiments of the present invention, short-circuit rings 1 are at first not realized in one piece, but rather are assembled from a plurality of partial ring segments 11. Such a partial ring segment 11 is shown in an enlarged depiction in FIG. 2. Each of the segments 11 has, on its side oriented toward the interior of the rotor and/or on its side oriented towards the exterior of rotor 3, a surface in the shape of a partial cylinder arc, so that a large number of partial ring segments 11 situated alongside one another in the circumferential direction form as a whole a short-circuit ring having a circular or cylindrical geometry.

On the outward-oriented side, segments 11 have one or more groove-type recesses 13 that are fashioned so that their cross-section is complementary to rods 7 that are to be accommodated. Depending on, for example, the available production possibilities and the size of the overall short-circuit ring that is to be produced, the individual partial ring segments 11 can have various sizes and can form a different angular region of the overall short-circuit ring. For example, a single segment 11 can have only one recess 13 or can have a plurality of recesses 13, for example up to twenty, while extending over an angular region of, for example, only a few degrees, or up to, for example, 30°.

On one of the side surfaces pointing in the circumferential direction, segment 11 can have a protruding region that can act as spring 15, whereas on an opposite side surface there can be situated a recess that can act as groove 17, so that adjacent segments 11 can be connected to one another by a groove-spring connection.

All segments 11 can preferably be made identical, so that they can easily be produced, transported, and stored. Theoretically, the segments can be stored and transported as bulk material.

A region of a yoke, i.e. underneath the grooves, can be provided with a coding. In the yoke region, a positive and negative contour can be indicated that can facilitate the joining of the segments to form a circular part. Segments 11 can here be used for both sides of the squirrel cage.

Segments 11 can for example be manufactured in an extrusion method. For this purpose, the segments are extruded into a matrix and are subsequently cut from the strand to the length of short-circuit ring 1 that is to be produced. Compared to a casting method, an extrusion of the segments can have the advantage that no end beveling, and thus no assembly with a preferred orientation, is required. A further advantage is the possibility of cold-hardening of extruded profiles, and increased loadability resulting therefrom, which can be used for example to increase rotational speed strength. A contour of a segment 11 can be fashioned such that, per segment, one or more rods 7, depending on the diameter of rotor 3, are covered, and a region of the yoke under the grooves is provided with a coding.

In order to assemble short-circuit ring 1, segments 11 are placed onto the protruding ends of rods 7 after rods 7 have been inserted into grooves 9 of rotor body 5. This is repeated until a closed circular part results that forms short-circuit ring 1. Subsequently, segments 11 are bonded, preferably materially, to rods 7, for example at the cladding surface and/or end face. Adjacent segments 11 are also bonded, preferably materially, to one another at adjacent surfaces. A gap that may exist between adjacent segments can here be closed.

The connection of adjacent segments 11, or the connection of one segment 11 to rods 7 introduced into its recesses 13, can for example take place via a welding process. In particular, a cladding surface and/or an end face of a segment 11 can be welded to rods 7 and to adjoining side surfaces of adjacent segments 11. Advantageously, a laser welding method can be used, by which even complex geometries can be welded together. Alternatively, the components can also be soldered to one another, such that either the components can be soldered to one another individually and partially, or a large part, or preferably all, of the components can be materially bonded to one another all together through immersion in a solder bath.

Figure 2:
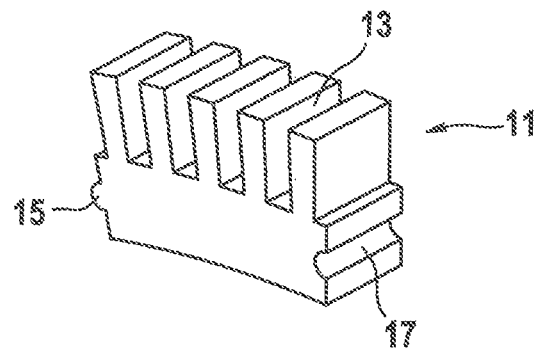
FIG. 2 shows a perspective view of a partial ring segment for a short-circuit ring according to a specific embodiment of the present invention.
Figure 3:
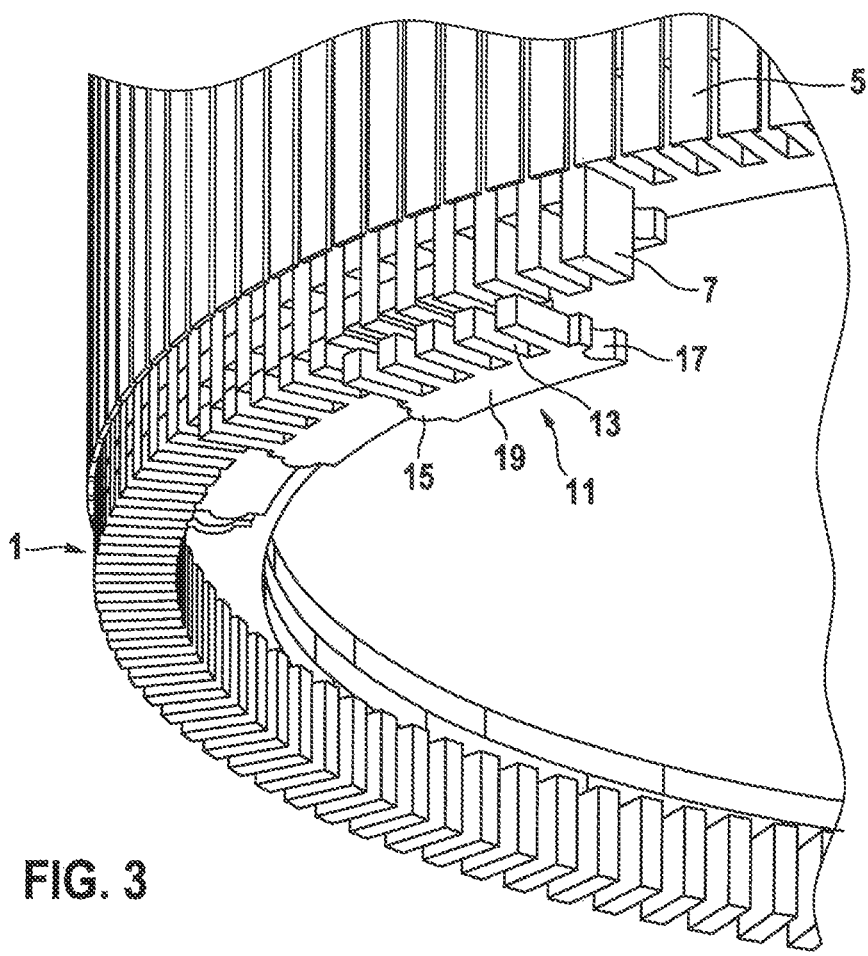
FIG. 3 shows a perspective view of a rotor for an electrical asynchronous machine having an alternative embodiment of a short-circuit ring according to an alternative specific embodiment of the present invention.
Figure 4:
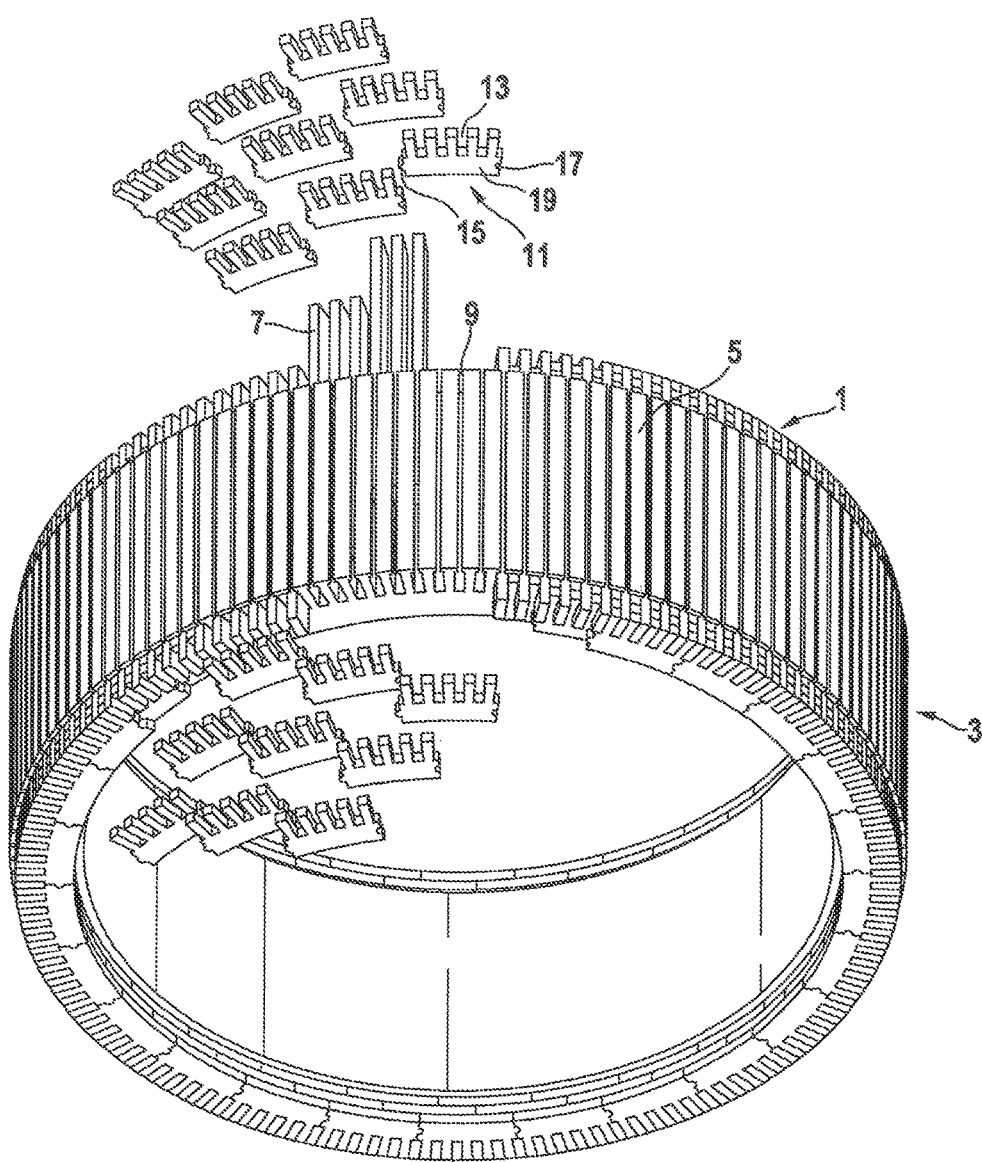
FIG. 4 shows a perspective top view of the rotor of FIG. 3.

FIGS. 3 and 4 show an alternative embodiment of a short-circuit ring 1 according to the present invention. In this case, the partial ring segments 11 are not provided as massive components having a material thickness of for example several millimeters, as shown in FIG. 2 and as can be produced in the extrusion method. Instead, segments 11 are provided in the form of thin sheets 19. Each individual sheet can here have a relatively thin material thickness, for example less than 5 mm, preferably less than 3 mm. Sheets 19 can be stamped into a suitable shape, in particular finely stamped. In order to form overall short-circuit ring 1 and to provide it with a thickness, measured in the axial direction of rotor 3, that enables adequate mechanical strength and adequate electrical conductivity, in the axial direction of short-circuit ring 1 a plurality of these thin sheets can be stacked one after the other. Thin sheets 19 configured in a plurality of layers can here be configured so as to be offset to one another in the circumferential direction.

As soon as the entire short-circuit ring 1 has been assembled in this way from a plurality of layers, sheets 19 of adjacent segments 11 can be materially bonded to one another. In this multilayer embodiment of short-circuit ring 1, soldering of the individual sheets 19 appears to be easier to carry out then welding, in particular if an immersion solder bath is used. In addition, this has the advantage that even different copper alloys can be bonded to one another, which can cause problems if laser welding is used.

What is claimed is:

1. A rotor for an electrical asynchronous machine, comprising:
   a rotor body, wherein on an outer side of which there are a number of grooves in a longitudinal direction, and wherein on the rotor body there is situated a rotor cage having oblong rods and circular short-circuit rings;
   wherein each of the circular short-circuit rings include multiple partial ring segments that form the circular short-circuit ring, wherein the short-circuit ring has, along the circumference of the short-circuit ring, one or more recesses extending in the axial direction, into which the oblong rods of the rotor cage of the asynchronous machine are selectively placed, and
   wherein the multiple partial ring segments each have a yoke portion radially inside of the recesses,
   wherein each of the multiple partial ring segments has, on its side oriented toward an interior of the rotor and/or on its side oriented towards an exterior of the rotor, a surface in a shape of a partial cylinder arc, so that a number of the multiple partial ring segments situated alongside one another in a circumferential direction form as a whole the short-circuit ring having a circular or cylindrical geometry,
   wherein the partial ring segments are configured as thin sheets, and multiple thin sheets are stacked one after the other in the axial direction of the short-circuit ring, and
   wherein the thin sheets in different planes in the axial direction are configured to be offset relative to one another in the circumferential direction.

2. The rotor as recited in claim 1, wherein the partial ring segments are extruded.

3. The rotor as recited in claim 1, wherein all partial ring segments forming the short-circuit ring have an identical geometry.

4. The rotor as recited in claim 1, wherein adjacent partial ring segments are connected to one another by a groove-spring connection.

5. The rotor as recited in claim 1, wherein adjacent partial ring segments are materially bonded to one another.

6. The rotor as recited in claim 1, wherein adjacent partial ring segments are one of welded or soldered to one another.

7. The rotor as recited in claim 1, wherein the partial ring segments include one of copper or a copper alloy.

8. The rotor as recited in claim 1, wherein the recesses each accommodate one of the ends of the oblong rods or corresponding cross sections of the recesses and the oblong rods.

9. A rotor for an electrical asynchronous machine, comprising:
   a rotor body, wherein on an outer side of which there are a number of grooves in a longitudinal direction, and wherein on the rotor body there is situated a rotor cage having oblong rods and circular short-circuit rings;
   wherein each of the circular short-circuit rings include multiple partial ring segments that form the circular short-circuit ring, wherein the short-circuit ring has, along the circumference of the short-circuit ring, a multiplicity of recesses extending in the axial direction, into which the oblong rods of the rotor cage of the asynchronous machine are selectively placed,
   wherein the oblong rods are placed into grooves of the rotor body and axially protrude therefrom, and
   wherein the short-circuit rings are situated on opposite axial ends of the rotor body,
   wherein the multiple partial ring segments each have a yoke portion radially inside of the recesses,
   wherein each of the multiple partial ring segments has, on its side oriented toward an interior of the rotor and/or on its side oriented towards an exterior of the rotor, a surface in a shape of a partial cylinder arc, so that a number of the multiple partial ring segments situated alongside one another in a circumferential direction form as a whole the short-circuit ring having a circular or cylindrical geometry,
   wherein the partial ring segments are configured as thin sheets, and multiple thin sheets are stacked one after the other in the axial direction of the short-circuit ring, and
   wherein the thin sheets in different planes in the axial direction are configured to be offset relative to one another in the circumferential direction.

10. The rotor as recited in claim 9, wherein the short-circuit rings include recesses in the form of grooves that can accommodate the ends of the oblong rods protruding past the rotor body, and wherein the oblong rods, which are configured at a distance from one another along the circumference and running parallel to one another, are both held mechanically and connected to one another electrically by the short-circuit rings.

* * * * *